(12) United States Patent
Huang

(10) Patent No.: US 12,495,349 B2
(45) Date of Patent: Dec. 9, 2025

(54) APPLICATION ACCELERATION BASED ON LOCAL NETWORK CONDITIONS

(71) Applicant: Tencent Technology (Shenzhen) Company Limited, Guangdong (CN)

(72) Inventor: Jiafeng Huang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 447 days.

(21) Appl. No.: 18/125,022

(22) Filed: Mar. 22, 2023

(65) Prior Publication Data
US 2023/0232308 A1    Jul. 20, 2023

Related U.S. Application Data

(63) Continuation of application No. PCT/CN2022/090860, filed on May 5, 2022.

(30) Foreign Application Priority Data

Jun. 8, 2021  (CN) .......................... 202110639432.7

(51) Int. Cl.
*H04W 40/12* (2009.01)
*H04W 84/12* (2009.01)

(52) U.S. Cl.
CPC ............ *H04W 40/12* (2013.01); *H04W 84/12* (2013.01)

(58) Field of Classification Search
None
See application file for complete search history.

(56) References Cited

U.S. PATENT DOCUMENTS 10,033,587 B2 *   7/2018  Tofighbakhsh ......... H04L 47/25
10,812,995 B2 *  10/2020  Chu ....................... H04L 43/10
(Continued)

FOREIGN PATENT DOCUMENTS

| CN | 102655664 A | 9/2012 |
| CN | 109302346 A | 2/2019 |

(Continued)

OTHER PUBLICATIONS

International Search Report in PCT/CN2022/090860, mailed Aug. 4, 2022, 5 pages.

(Continued)

*Primary Examiner* — Brian S Roberts
(74) *Attorney, Agent, or Firm* — ArentFox Schiff LLP

(57) ABSTRACT

An application acceleration method includes identifying a data packet to be transmitted by an application running on a mobile terminal as a data packet to be accelerated to an application server, and determining network communication qualities of a first network transmission path to an access node via a wireless LAN communication network and a second network transmission path to the access node via a mobile network. The method further includes selecting a network transmission path based on network communication quality from the first network transmission path and the second network transmission path, and transmitting the data packet to the access node via the selected network transmission path such that the access node transmits the data packet to the application server through the network acceleration channel. Apparatus and non-transitory computer-readable storage medium counterpart embodiments are also contemplated.

20 Claims, 6 Drawing Sheets

(56) References Cited

U.S. PATENT DOCUMENTS

| | | | |
|---|---|---|---|
| 10,952,122 B2* | 3/2021 | Pan | H04W 36/0027 |
| 11,956,147 B2* | 4/2024 | Hao | H04L 67/2871 |
| 12,143,860 B1* | 11/2024 | Kwok | H04W 28/0268 |
| 2017/0289885 A1 | 10/2017 | Kaushik | |
| 2022/0116327 A1* | 4/2022 | Salkintzis | H04W 28/0865 |

FOREIGN PATENT DOCUMENTS

| | | |
|---|---|---|
| CN | 110099403 A | 8/2019 |
| CN | 110233937 A | 9/2019 |
| CN | 112996042 A | 6/2021 |
| WO | 2019233492 A1 | 12/2019 |

OTHER PUBLICATIONS

Written Opinion in PCT/CN2022/090860, mailed Aug. 4, 2022, 6 pages.

\* cited by examiner

APPLICATION ACCELERATION BASED ON LOCAL NETWORK CONDITIONS

RELATED APPLICATIONS

This application is a continuation of International Application No. PCT/CN2022/090860, entitled "APPLICATION PROGRAM ACCELERATION METHOD, APPARATUS AND DEVICE, AND STORAGE MEDIUM" and filed on May 5, 2022, which claims priority to Chinese Patent Application No. 202110639432.7, entitled "APPLICATION ACCELERATION METHOD, APPARATUS, DEVICE AND STORAGE MEDIUM" and filed on Jun. 8, 2021. The entire contents of the prior applications are incorporated herein by reference.

FIELD OF THE TECHNOLOGY

This application relates to the field of network, including application acceleration.

BACKGROUND OF THE DISCLOSURE

With the continuous development of network technology, the types of Internet-based applications are increasing.

After a mobile terminal starts an application, there is a data interaction between the application and a program server. If the communication network to which the mobile terminal is connected is unstable (e.g. poor network speed or network disconnection), the data interaction between the application and the program server may be delayed, even resulting in undesirable situations such as the application being disconnected. For example, in a case of online games, in the process of running online games on a mobile terminal, if the communication network to which the mobile terminal is connected is unstable, the game will be stuck or even disconnected. However, it is common that the mobile terminal has network fluctuations; therefore, how to reduce the influence of network fluctuations on the application running on the mobile terminal and improve the running stability of the application at a mobile terminal side is a technical problem to be solved.

SUMMARY

In view of this, in order to solve the above-mentioned problems, this disclosure provides an application acceleration method, apparatus, device and storage medium, so as to reduce a situation that an application runs abnormally due to network fluctuations of a mobile terminal, and improve the stability of the application running at a mobile terminal side.

In an embodiment, an application acceleration method performed by a mobile terminal includes identifying a data packet to be transmitted by an application running on the mobile terminal as a data packet to be accelerated to an application server. The mobile terminal is configured to access a wireless local area network (LAN) communication network and a mobile network. The method further includes determining network communication qualities of a first network transmission path and a second network transmission path associated with the application, the first network transmission path being a communication path to an access node via the wireless LAN communication network, the second network transmission path being a communication path to the access node via the mobile network. The access node is configured to access a network acceleration channel. The method further includes selecting a network transmission path based on network communication quality from the first network transmission path and the second network transmission path, and transmitting the data packet to the access node via the selected network transmission path such that the access node transmits the data packet to the application server through the network acceleration channel.

In an embodiment, an application acceleration apparatus includes processing circuitry configured to identify a data packet to be transmitted by an application running on a mobile terminal as a data packet to be accelerated to an application server. The mobile terminal is configured to access a wireless local area network (LAN) communication network and a mobile network. The processing circuitry is further configured to determine network communication qualities of a first network transmission path and a second network transmission path associated with the application, the first network transmission path being a communication path to an access node via the wireless LAN communication network, the second network transmission path being a communication path to the access node via the mobile network. The access node is configured to access a network acceleration channel. The processing circuitry is further configured to select a network transmission path based on network communication quality from the first network transmission path and the second network transmission path, and transmit the data packet to the access node via the selected network transmission path such that the access node transmits the data packet to the application server through the network acceleration channel.

In an embodiment, a non-transitory computer-readable storage medium storing computer-readable instructions thereon, which, when executing by processing circuitry, cause the processing circuitry to perform an application acceleration method. The application acceleration method includes identifying a data packet to be transmitted by an application running on a mobile terminal as a data packet to be accelerated to an application server. The mobile terminal is configured to access a wireless local area network (LAN) communication network and a mobile network. The method further includes determining network communication qualities of a first network transmission path and a second network transmission path associated with the application, the first network transmission path being a communication path to an access node via the wireless LAN communication network, the second network transmission path being a communication path to the access node via the mobile network. The access node is configured to access a network acceleration channel. The method further includes selecting a network transmission path based on network communication quality from the first network transmission path and the second network transmission path, and transmitting the data packet to the access node via the selected network transmission path such that the access node transmits the data packet to the application server through the network acceleration channel.

Since the network transmission path is a network channel from the communication network locally accessed by the mobile terminal to the access node of the network acceleration channel, the network communication quality of the network transmission path reflects the network condition of the local network of the mobile terminal, and rationally selecting the local communication network and the access node configured to transmit the data packet based on the quality of the network condition of the local network of the mobile terminal can reduce the data interaction delay and even interruption between the application and the application server due to the instability of the local network of the mobile terminal, thus reducing the abnormal operation of the application and improving the stability of the mobile terminal running the application.

DESCRIPTION OF EMBODIMENTS

A solution of this disclosure can be applied to a mobile terminal, so as to reduce a situation that the network fluctuation of the mobile terminal causes the application to experience operation instability such as blocking and disconnecting.

The following describes the technical solutions in the embodiments of this disclosure with reference to the accompanying drawings in the embodiments of this disclosure. The described embodiments are some of the embodiments of this disclosure rather than all of the embodiments. Based on the embodiments in this disclosure, other embodiments obtained by a person of ordinary skill in the art fall within the scope of protection of this disclosure.

To facilitate understanding, an application acceleration system applicable to the solution of this disclosure will be described first.

Figure 1:
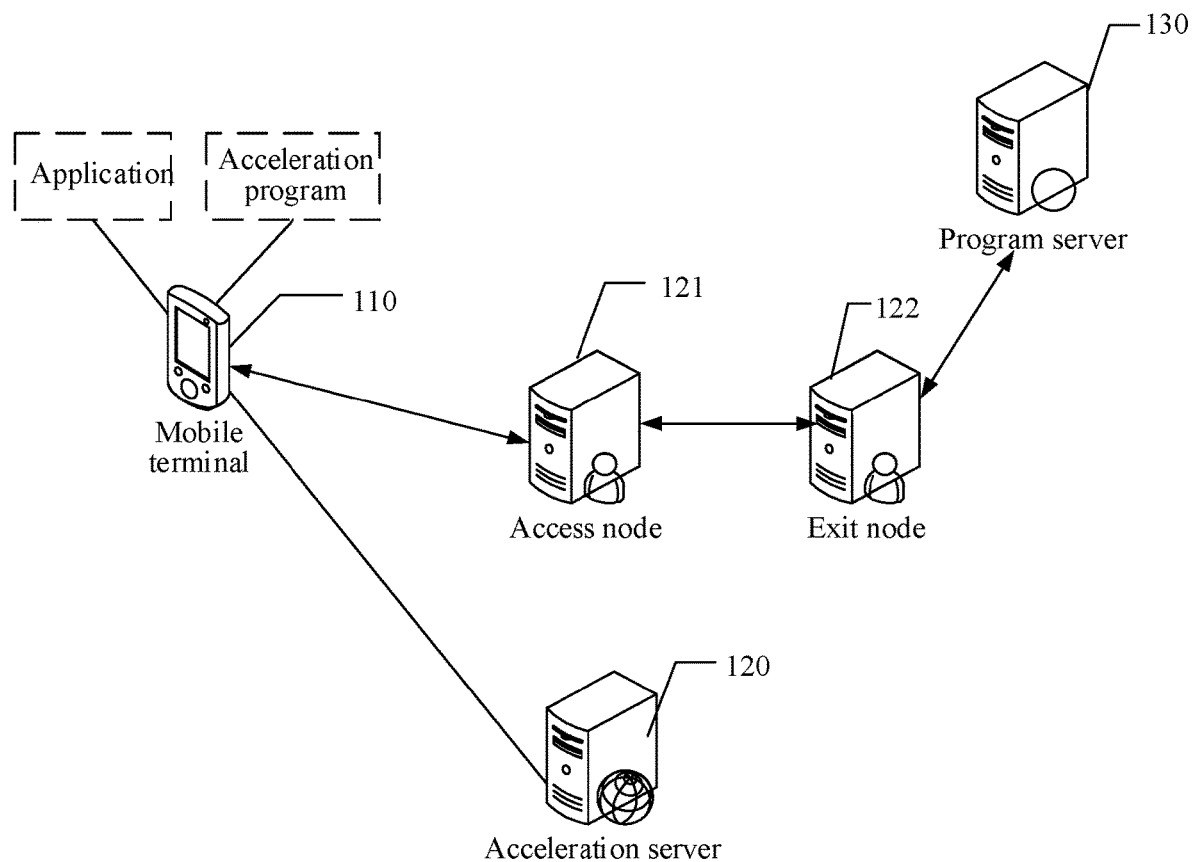
FIG. 1 is a schematic diagram of a component architecture of an application acceleration system applicable to a solution according to an embodiment of this disclosure.

FIG. 1 is a schematic diagram of a component architecture of an application acceleration system according to this disclosure.

As shown in FIG. 1, the application acceleration system includes: a mobile terminal 110 running an acceleration program. The acceleration program is configured on the mobile terminal in a form of an acceleration client.

The acceleration program is configured to improve data transmission efficiency between the application running in the mobile terminal and a program server (application server).

The application acceleration system may further include: an acceleration server 120 corresponding to the acceleration client, and a plurality of access nodes 121 (one access node is illustrated as an example in FIG. 1) for improving data transmission rate of a game.

Each access node 121 is a node server set in the application acceleration system for accessing a network acceleration channel. Each access node 121 is configured with a network acceleration channel formed by the access node 121 and an exit node 122 uniquely corresponding to the access node.

The exit node 122 is also a node server, and the access node and the exit node corresponding to the same network acceleration channel access a communication network belonging to the same operator; therefore, transmitting data from the access node of the same network acceleration channel to the exit node does not involve switching communication networks of different operators, so that the data transmission rate can be improved.

In this disclosure, the mobile terminal may also run the application, which may be an Internet-based program. For example, the application may be any application that uses Internet-based interaction with the program server. Accordingly, the mobile terminal can perform data interaction with the program server 130 based on the running application.

For example, the application may be an Internet-based game application or a network game such as a web game, on the basis of which the network game may enable interaction of game-related data with a game server via the Internet.

In this disclosure, the mobile terminal can connect to a near field wireless communication network (i.e., a wireless LAN communication network), such as a Wi-Fi network, while connecting to the mobile network (also referred to as a cellular network).

On this basis, in order to improve the speed of data interaction between the application and the program server, and reduce the running instability of the application caused by network fluctuations, in this disclosure, after determining the application needing to be accelerated, the acceleration client will configure at least one access node for the application (in order to facilitate distinguishing, the access node configured for the application is also referred to as a set access node). Since the access node is connected to the network acceleration channel, configuring at least one access node is actually to configure at least one network acceleration channel for the application in the mobile terminal.

On this basis, the acceleration client may configure a first network transmission path and a second network transmission path, wherein the first network transmission path is to the access node of the network acceleration channel via the near field wireless communication network locally accessed by the mobile terminal, and the second network transmission path is to the access node of the network acceleration channel via the mobile network locally accessed by the mobile terminal.

The access node in the first network transmission path and the access node on the second network transmission path may be the same or different, and therefore the network acceleration channel accessed by the access nodes on the first network transmission path and the second network transmission path may be the same or different.

It is to be noted that the above is explained by taking a component architecture of the application acceleration system as an example, and the application acceleration system may have other possibilities in practical applications, and it is not limited in this disclosure.

The application acceleration method of this disclosure is described below with reference to a flowchart.

Figure 2:
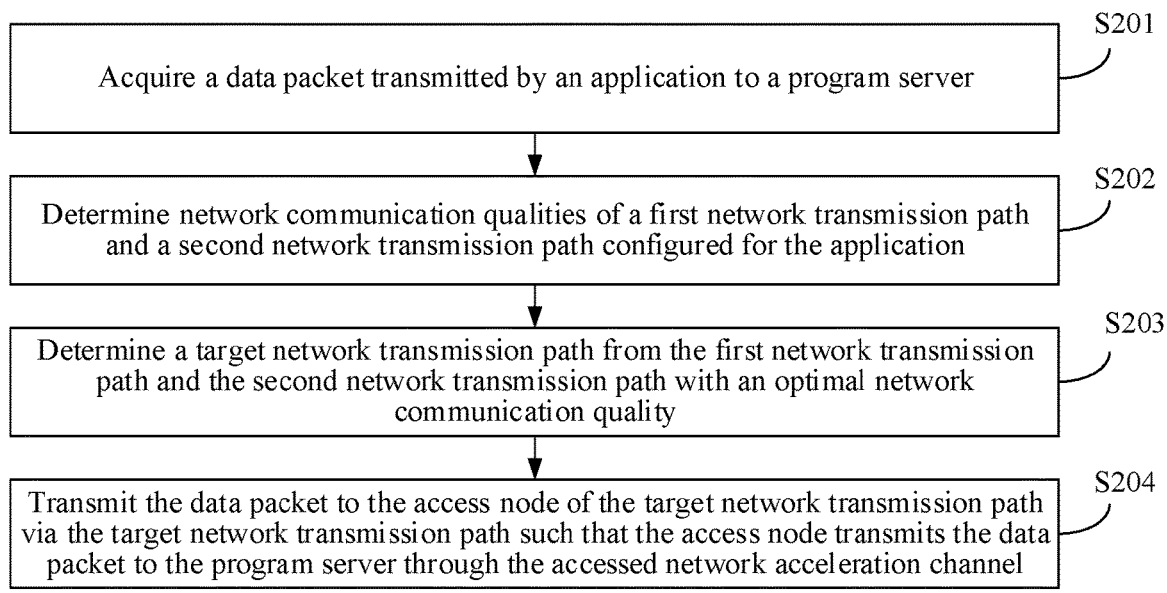
FIG. 2 is a flowchart of an application acceleration method according to an embodiment of this disclosure.

First, the application acceleration method of this disclosure is introduced from a mobile terminal side. FIG. 2 is a flowchart of an embodiment of an application acceleration method according to this disclosure, and the method of the present embodiment can be applied to the mobile terminal configured with the acceleration client, and the mobile terminal accesses the near field wireless communication network and the mobile network. The method in this embodiment may include the following steps.

S201: Acquire a data packet transmitted by an application to a program server. In an embodiment, a data packet to be transmitted by an application running on the mobile terminal is identified as a data packet to be accelerated to an application server. The mobile terminal is configured to access a wireless local area network (LAN) communication network and a mobile network.

The application is an application that needs to improve the data transmission rate by the acceleration client. As described above, the application runs in the mobile terminal with the acceleration client.

In one possible scenario, the acceleration client may acquire a data matching rule for the application, the data matching rule being configured to match out the data packet transmitted by the application to the program server.

For example, the acceleration client may acquire the data matching rule applicable to the application from the acceleration server.

As another example, the acceleration client locally stores the data matching rule corresponding to the application. For example, the acceleration client historically performs an acceleration operation on the application, and therefore the acceleration client will save the data matching rule for the application in the mobile terminal, and on this basis, the locally saved data matching rule corresponding to the application can be called.

Since the domain name and IP involved in the data packet transmitted by the application to the program server are relatively fixed, the data matching rule may be the matching characteristics of the domain name and IP address possibly involved in the data packet transmitted by the application to the program server. On this basis, this disclosure can intercept the data packet containing the domain name or the IP address meeting the data matching characteristics based on the data matching rule, so as to obtain the data packet transmitted by the application to the program server.

In an alternative embodiment, in order to simplify the data matching rule and reduce the complexity of matching the data packet, the data matching rule in this disclosure may include: a domain name matching rule and an IP matching rule. The domain name matching rule is a rule constructed using a regular expression, and the IP matching rule includes an IP address field composed of a reference IP and a subnet mask group.

Accordingly, the data packet matching the data matching rule is: a data packet containing the domain name matching the regular expression, or a data packet containing the IP address belonging to the IP address field.

It is to be understood that, compared with configuring multiple domain names, the domain name matching rule constructed using the regular expression can reduce the complexity of configuring the data matching rule, and the complexity of matching the domain name in the data packet with the regular expression is relatively low and also relatively efficient, which avoids the complexity caused by comparing the domain name contained in the data packet with the configured multiple domain names one by one.

Similarly, based on the IP address field covered by the reference IP and subnet mask in the IP matching rule, it can be intuitively determined whether the IP address in the data packet belongs to the IP address field, which is beneficial to determine more efficiently whether the data packet is a data packet needing to be intercepted, namely, whether the data packet belongs to the data packet transmitted by the application.

S202: Determine network communication qualities of a first network transmission path and a second network transmission path configured for the application. In an embodiment, network communication qualities of a first network transmission path and a second network transmission path associated with the application are determined. The first network transmission path is a communication path to an access node via the wireless LAN communication network and the second network transmission path is a communication path to the access node via the mobile network. The access node is configured to access a network acceleration channel.

The first network transmission path is a communication path to the set access node via the near field wireless communication network. The second network transmission path is a communication path to the set access node via the mobile network. The set access node is an access node configured by the acceleration client for the application for accessing the network acceleration channel.

The first network transmission path and the second network transmission path are pre-configured before acquiring the data packet transmitted by the application, for example, after the acceleration client determines that an application needs to be accelerated, or when the application is started, the first network transmission path and the second network transmission path can be configured for the application.

In practical applications, configuring the first network transmission path can be achieved by configuring information of the access node corresponding to the near field wireless channel network accessed by the mobile terminal. Similarly, configuring the second network transmission path can be achieved by configuring information of an interface node corresponding to the mobile network accessed by the mobile terminal.

For example, after determining that the application needs to be accelerated, the acceleration client may select at least one access node from a plurality of access nodes configured by the application acceleration system as a corresponding set access node for the application.

The network communication quality of the network transmission path represents a network condition between the near field wireless communication network or the mobile network corresponding to the network transmission path and the set access node. The purpose of measuring the network communication quality of the network transmission path on a premise that the network acceleration channel connected by the set access node is fixed is to measure a network condition of the near field wireless communication network or the mobile network locally accessed by the mobile terminal, namely, the local network condition of the mobile terminal.

The network communication quality can represent the network conditions such as network speed, data packet delay, packet loss and jitter corresponding to the network transmission path.

It is to be understood that the time for determining the network communication quality of the network transmission path may be after intercepting the data packet transmitted by the application, for example, the current network communication qualities of the network transmission path can be obtained by testing the network communication qualities of the network transmission path.

However, testing the network communication quality of the network transmission path in real time after acquiring the data packet necessarily takes a certain amount of time, which may cause transmission delay of the data packet. Based on this, in an alternative embodiment, the acceleration client in this disclosure can test the network communication qualities of the first network transmission path and the second network transmission path configured for the application when the network test condition is satisfied.

The network test condition can be set according to needs, for example, a network quality test period can be set, and when the set network test moment is reached according to the network test period, it is confirmed that the network test condition is satisfied.

By setting the network test condition, the network quality of the near field wireless communication network and the mobile network locally accessed by the mobile terminal can be monitored regularly or irregularly after the acceleration client activates the application, and the network condition of the local network can be determined in time when the data packet transmitted by the application is acquired.

Accordingly, after acquiring the data packet, the network communication qualities of a latest tested first network transmission path and the second network transmission path may be acquired.

It is to be understood that there may be many possible specific forms of network communication qualities.

For example, in one example, a specific form of the network communication quality may be a network quality score that represents the network conditions, which may be a score or level that represents the network communication qualities. In such example, testing the network communication quality of the network transmission path may include: performing network quality test on the network transmission path, and determining the network quality score according to the network quality test result.

The network quality test can refer to obtaining the values of parameters such as network speed, data packet transmission delay, packet loss and network signal jitter, which can represent the network communication quality by means of speed measurement, etc.; however, this is not limited, and a specific embodiment will be taken as an example for illustrating, which will not be described in detail herein.

Determining the network quality score according to the network quality test result may be that the acceleration client calculates the network quality score according to the network quality test result; alternatively, the acceleration client transmits the network quality test result to the acceleration server and obtains the network quality score calculated by the acceleration server based on the network quality test result.

In yet another example, the network communication quality may also be a value of at least one network condition parameter obtained by network quality test and representing the network communication quality, such as the values of parameters like network speed, packet transmission delay, packet loss and network signal jitter.

S203: Determine the network transmission path with the optimal network communication quality as a target network transmission path from the first network transmission path and the second network transmission path. In an embodiment, a network transmission path is selected based on network communication quality from the first network transmission path and the second network transmission path.

In order to facilitate distinguishing, the network transmission path with the optimal network communication quality among the first network transmission path and the second network transmission path is referred to as the target network transmission path.

For example, in an example, the network transmission path with the higher network quality score may be determined as the target network transmission path in a case that the network communication quality is the network quality score.

In yet another example, if the network communication quality is a value of at least one network condition parameter, the network transmission path with the optimal network communication quality may be determined according to the priority of each network condition parameter and the value of the network condition parameter.

For example, since a network disconnection may cause disconnection between the application and the program server, the network condition parameter which can represent whether the network is disconnected can be preferentially viewed, and the network transmission path which does not have a network disconnection can be selected; if neither of the two network transmission paths is disconnected, the corresponding network condition parameters representing the network speed and stability of the two network transmission paths can be viewed to determine the target network transmission path with the optimal network communication quality.

It is to be understood that by selecting the optimal network transmission path, the data packet can be transmitted to the network acceleration channel more stably and at a high speed via the network transmission path, so as to ensure that the data packet is accelerated to be transmitted to the program server via the network acceleration channel.

S204: Transmit the data packet to the access node of the target network transmission path via the target network transmission path such that the access node transmits the data packet to the program server through the accessed network acceleration channel. In an embodiment, the data packet is transmitted to the access node via the selected network transmission path such that the access node transmits the data packet to the application server through the network acceleration channel.

It is to be understood that in this disclosure, the purpose of transmitting the data packet to the set access node via the target network transmission path is essentially: it is necessary to efficiently transmit the data packet via the network acceleration channel corresponding to the set access node. On this basis, after obtaining the data packet, the set access node will transmit the data packet to a corresponding exit node (namely, the exit node in the network acceleration channel accessed by the set access node), so that the data packet is transmitted to the program server via the network acceleration channel corresponding to the set access node.

In order to improve the speed of data interaction between the application and the program server, the application needing to be accelerated can be selected via the acceleration client. After a dedicated network acceleration channel is selected and configured for the application and the application is started, the acceleration client may intercept the data packet transmitted by the application to the program server and transmit the data packet to the program server via the network acceleration channel so as to improve the transmission speed of the data packet to the server via the network acceleration channel.

Transmitting the data packet via the dedicated network acceleration channel can solve a situation that after the mobile terminal transmits out the data packet, the transmission of the data packet is delayed or even abnormal due to frequent switching of communication networks of different operators or instability of the communication network of a certain operator.

However, network fluctuations may also exist in the near field wireless communication network and the mobile network (the mobile network of the cell to which the mobile terminal belongs) locally accessed by the mobile terminal, and on this basis, if the communication network used by the mobile terminal to transmit the data packet has network fluctuations such as network disconnection, the stability of data interaction between the application and the program server may also be affected.

Based on this, in order to further reduce the influence on the application due to the network fluctuation of the local network of the mobile terminal and improve the stability of the application, it is necessary to determine the network conditions of the near field wireless communication network and the mobile network accessed by the mobile terminal side, and to realize selecting a more stable local communication network of the mobile terminal to transmit data packets to the network acceleration channel.

However, in a case that the access node configured for the application is fixed, the network communication quality of the mobile terminal to the access node via the near field wireless communication network or the mobile network essentially reflects the network condition of the near field wireless communication network or the mobile network. Based on this, this disclosure can rationally select a communication network for the mobile terminal to connect to the network acceleration channel based on the network condition of the near field wireless communication network or the mobile network.

It can be seen from the above that the mobile terminal configured with the application accesses the near field wireless communication network and the mobile network, and the first network transmission path to the set access node via the near field wireless communication network and the second network transmission path to the set access node via the mobile network are set for the application. After acquiring the data packet transmitted by the application to the program server, the network transmission path with the optimal network communication quality is determined as the target network transmission path from the two network transmission paths, and the target network transmission path transmits the data packet to the program server. Since the network transmission path is a network channel from the communication network locally accessed by the mobile terminal to the access node of the network acceleration channel, the network communication quality of the network transmission path reflects the network condition of the local network of the mobile terminal; and based on the quality of the local network condition of the mobile terminal, rationally selecting the local communication network and the access node for transmitting the data packet can reduce abnormal conditions such as data interaction delay and even interruption between the application and the program server caused by the instability of the local network of the mobile terminal. It also improves the stability of the mobile terminal running the applications.

It is to be understood that in this disclosure the access nodes in the first network transmission path and the second network transmission path may or may not be the same.

If the access nodes of the first network transmission path and the second network transmission path are the same, it is equivalent to the case that the acceleration client sets a dedicated network acceleration channel for the application.

In practical applications, the network acceleration channel applicable to the near field wireless communication network accessed by the mobile terminal of this disclosure and the mobile network may be different.

Based on this, in an alternative embodiment, the set access nodes on the first network transmission path and the second network transmission path may be different in order to increase the speed of data interaction between the application and the program server and to reduce instability of the application due to network fluctuations. Specifically, the set access node includes a first access node and a second access node. The acceleration client, after determining the application needing to be accelerated, configures the application with the first access node applicable to the near field wireless communication network and the second access node applicable to the mobile network, respectively. The first access node and the second access node are configured with different network acceleration channels.

For example, the first network transmission path to the first access node via the near field wireless communication network is configured by configuring a corresponding relationship between the near field wireless communication network and the first access node. Similarly, the second network transmission path to the second access node via the mobile network is configured by configuring the corresponding relationship between the mobile network accessed by the mobile terminal and the second access node.

Figure 3:
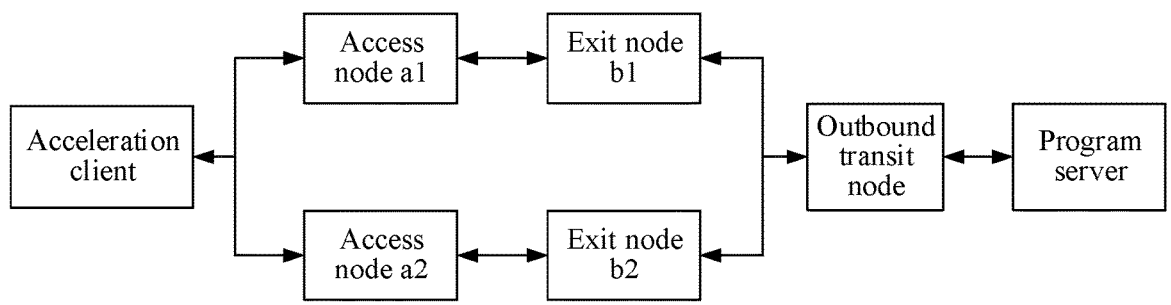
FIG. 3 is a schematic diagram of different network acceleration channels configured for different communication networks locally accessed by a mobile terminal according to an embodiment of this disclosure.

To facilitate understanding, reference may be made to FIG. 3, which is a schematic diagram of different network acceleration channels configured for different communication networks locally accessed by the mobile terminal in this disclosure.

In FIG. 3, the near field wireless communication network accessed by the mobile terminal with the acceleration client is illustrated as a Wi-Fi network.

It can be seen from FIG. 3 that an access node a1 is connected to the acceleration client via the Wi-Fi network, and the access node a1 and an exit node b1 form a network acceleration channel 1, so that the acceleration client can be connected to the network acceleration channel 1 formed by the access node a1 to the exit node b1 via the network transmission path between the Wi-Fi network and the access node a1.

The acceleration client is connected to the access node a2 via the mobile network, and a network acceleration channel 2 is formed between the access node a2 and an exit node b2, so that the acceleration client can be connected to the network acceleration channel 2 via a network transmission path between the mobile network and the access node a2.

On the basis of the above, this disclosure can rationally select the network transmission path to access the network acceleration channel according to the network conditions of the near field wireless communication network and the mobile network locally accessed by the mobile terminal, so as to achieve a more stable application acceleration effect.

It is to be understood that, in order to avoid switching different network acceleration channels to cause disconnection of the application (such as disconnection between the application and the program server), the application acceleration system of this disclosure can also set a unified outbound transit node for different network acceleration channels. In this case, the exit node of each network acceleration channel is connected to the same outbound transit node, and the outbound transit node is used for connecting to the program server of the application. At the same time, it can also be seen from FIG. 3 that the exit node b1 and the exit node b2 are both connected to the program server via the outbound transit node.

On this basis, data transmitted by each network acceleration channel will be forwarded to the program server via the outbound transit node, and the program server will return data to each network acceleration channel via the outbound transit node.

The outbound transit node may be a node server independently provided outside each exit node, or may multiplex a certain exit node among a plurality of exit nodes as an outbound transit node. By multiplexing a certain exit node as the outbound transit node, the number of times that the exit node forwards data of the application can also be reduced, and the data transmission rate of the application can also be improved.

Since the node server directly connected to the program server is always the outbound transit node, no matter how the acceleration client switches the network acceleration channel, the program server side always obtains the data transmitted by the application through the same outbound transit node, so that the program server will not sense the switching of the network acceleration channel, and naturally will not cause the application to disconnection due to the switching of the network acceleration channel.

Accordingly, the data returned by the program server to the application is also transmitted to the outbound transit node, and is transmitted to the mobile terminal with the application by the outbound transit node using the corresponding network acceleration channel.

In this disclosure, there are many possible ways for selecting the first access node for the near field wireless communication network. In an alternative embodiment, after determining the plurality of access nodes for improving the data transmission rate for the application, the access node that satisfies the condition for the network communication quality with the near field wireless communication network is selected as the first access node. Similarly, the second access node is an access node, which satisfies a condition for network communication quality with the mobile network, of the plurality of access nodes.

The application acceleration system may configure the plurality of access nodes for the application in advance. The plurality of access nodes corresponding to different applications may also be different. In addition, the plurality of access nodes corresponding to the application are related to a geographical location of the mobile terminal running the application.

For each access node, there may be multiple specific ways for separately obtaining the network communication qualities to the access node via the near field wireless communication network. For example, the speed measurement can be performed on the access node via the near field wireless communication network, and the network communication quality is determined according to the speed measurement result. Certainly, there may be other possible ways for determining the network communication quality, this disclosure is not limited thereto.

It is to be understood that the conditions to be satisfied for network communication quality as referred to herein may be set as desired. For example, the network communication quality may exceed a certain level or value. In an alternative embodiment, the conditions to be satisfied for network communication quality may be the optimal network communication quality in order to minimize application blocking and even disconnection.

Figure 4:
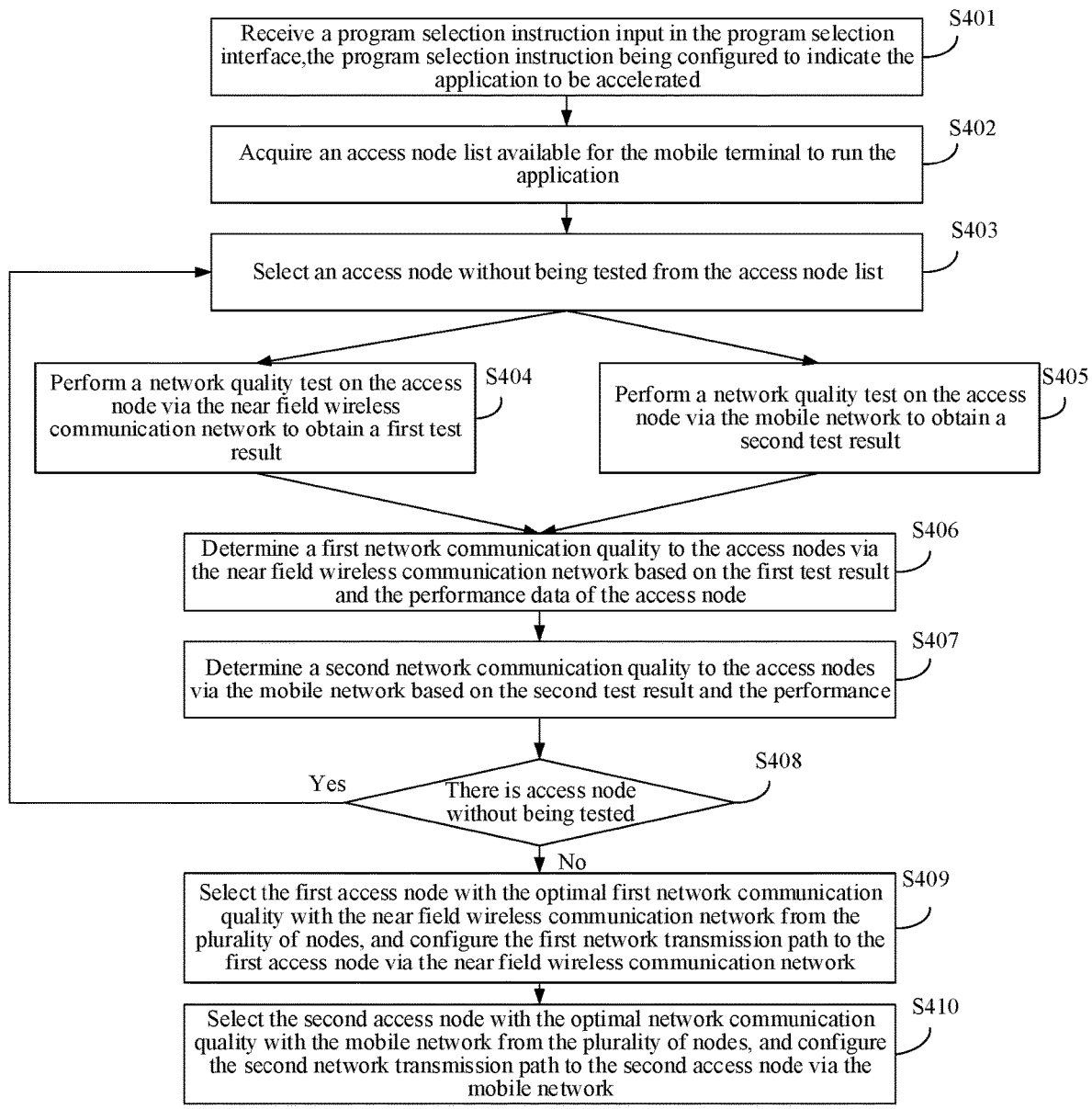
FIG. 4 is a flowchart of a network transmission path and a network acceleration channel configured for an application according to an embodiment of this disclosure.

To facilitate understanding, an implementation of the network transmission path and the network acceleration channel configured for the application is taken as an example for illustrating as follows. FIG. 4 is a flowchart of a network transmission path and a network acceleration channel configured for an application according to an embodiment of this disclosure. The method of the embodiment is applied to the acceleration client, and the method of the embodiment may include the following steps:

S401: Receive a program selection instruction inputted in the program selection interface.

The program selection interface displays information of at least one candidate application available for selection.

The program selection instruction is for indicating the application among the at least one candidate applications (i.e. the application mentioned in S201).

For example, after the mobile terminal starts the acceleration client, the acceleration client may display the program selection interface in which a list of alternative accelerated programs is displayed, which may include one or more alternative candidate applications. On this basis, if the user wishes to accelerate a certain application in the program list, the application can be selected in the program selection interface to trigger the input of program selection instructions for the application. Accordingly, the acceleration client may determine the application to be accelerated based on the received program selection instructions.

For example, taking the acceleration of the game by the acceleration client as an example, the program selection interface may be a game acceleration selection interface for selecting a game to be accelerated, such as the interface shown in FIG. 8, which will be described later in conjunction with this case, and will not be described in detail herein.

S402: Acquire an access node list available for the mobile terminal to run the application.

The access node list identifies the plurality of access nodes which improve the data transmission rate of the application or which provide an acceptable data transmission rate for the application.

It is to be understood that the access node list refers to a list of access nodes that may be selected by the application in case the application is run by the mobile terminal. The access node list is based not only on the application, but also on the geographical location of the mobile terminal running the application.

In a possible implementation, the acceleration client may transmit a node list request to the acceleration server, the node list request carrying information of the application to be accelerated, e.g. the name or identification of the application. At the same time, the node list request may also carry an IP address of the mobile terminal.

On this basis, the acceleration server may determine the access node list available to the application according to the IP address and the information of the application. For example, the geographical location of the mobile terminal is determined according to the IP address, at least one access node which can be provided for use by the application is determined in combination with the geographical location, and the access node list containing the information of the at least one access node is returned to the acceleration client.

In yet another possible implementation, the acceleration client may be pre-configured with information of the access node applicable to the applications of different geographical areas and different kinds. On this basis, the acceleration client can also determine at least one access node which can be selected for running the application in the mobile terminal according to the geographical location of the mobile terminal and the name (or category, etc.) of the application, so as to obtain the access node list containing information of the at least one access node.

S403: Select an access node without being tested from the access node list, and perform S404 and S405 respectively.

S404: Perform a network quality test on the access node via the near field wireless communication network to obtain a first test result.

The first test result can be a network quality test result of the network transmission path to the access node via the near field wireless communication network accessed by the mobile terminal. For example, the first test result includes: the values of one or more of a plurality of network speed evaluation parameters, such as packet loss, delay and jitter.

In one example, the network test packet can be transmitted to the access node via the near field wireless communication network accessed by the mobile terminal, and a test feedback result of the network test packet is received. The network test packet is a data packet for network testing.

For example, an Internet control message protocol (ICMP) can be used, and a network test packet can be generated by issuing a ping command and transmitted to the access node via the near field wireless communication network.

Certainly, an example is taken for illustrating herein; and in practical applications, there may be network speed measurement based on the User Datagram Protocol (UDP) or the network quality test via other protocols, etc., it is not limited.

The frequency and specific manner of transmitting the network test packet may be set as needed, without limitation. For example, 10 network test packets may be transmitted every second and repeated three times.

The test feedback result of the network test packet is relevant information, such as response data fed back by the access node for the network test packet and the receiving time of the response data. The specific situation of packet loss, delay and jitter existing from the mobile terminal to the access node can be calculated according to the test feedback result of the network test packet.

It is to be understood that in order to be able to transmit data, such as test packets, related to the network quality test to the access node via the near field wireless communication network, the acceleration client will create a socket of the near field wireless communication network at the mobile terminal before the network quality test. On this basis, data such as the test packet can be transmitted to the access node via the socket of the near field wireless communication network, so as to realize network quality test on the access node via the near field wireless communication network.

S405: Perform a network quality test on the access node via the mobile network to obtain a second test result.

The second test result may be a network quality test result of the network path to the access node via the mobile network accessed by the mobile terminal. For example, the second test result may also include: the values of one or more of a plurality of network speed evaluation parameters, such as packet loss, delay and jitter.

Similarly, before S405, the acceleration client may create a socket of the mobile network on the mobile terminal, and accordingly, the access node may be subjected to the network quality test via the socket of the mobile network.

The network quality test of the access node via the mobile network is similar to the above-mentioned S404, for example, a network test packet can be transmitted to the access node via the mobile network and a test feedback result can be received, and reference can be made to the relevant introduction of S404 for details, which will not be described in detail herein.

S406: Determine a first network communication quality to the access node via the near field wireless communication network based on the first test result and performance data of the access node.

The performance parameters may include, without limitation, the load condition of the access node, and may also include, without limitation, the data processing speed of the access node.

In one example, the acceleration client can transmit a performance request to the access node. The access node returns its performance data to the acceleration client in response to the performance request.

In yet another example, the acceleration client may request the access node to feed back its performance parameters during network quality test of the access node. On this basis, the acceleration client does not need to separately request performance data from the access node.

In yet another possible implementation, the first network communication quality may be calculated by the acceleration client according to the first test result and the performance parameter.

In a possible implementation, the acceleration client may transmit the first test result and the performance parameter to the acceleration server. Accordingly, the acceleration server calculates the first network communication quality according to the first test result and the performance data, and returns the first network communication quality to the acceleration client, so that the acceleration client obtains the first network communication quality.

In this second possible implementation, the acceleration server may be more flexible in setting the calculation rules for calculating the first network communication quality without requiring adjustments to the acceleration client.

There may be various specific ways for the acceleration server or the acceleration client to calculate the first network communication quality based on the first test result and the performance data, and this disclosure does not limit this.

In one example, the acceleration server may determine the network communication quality based on set weight coefficients of test results and performance data and in combination with the first test result and the performance data.

Under a condition that the test result includes a numerical value of a plurality of parameters, the weight coefficient of the test result in the acceleration server may include a respective weight coefficient of the plurality of parameters. Similarly, under a condition that the performance data packet includes a plurality of performance parameters, performance weights for different performance parameters may be set in the acceleration server.

For example, it is assumed that the first test result is a speed measurement result obtained by performing network speed measurement on the access node via the near field wireless communication network, the first test result includes a value of at least one network speed evaluation parameter, and accordingly, in the case that the performance data packet includes a value of at least one performance parameter, the weight of each network speed evaluation parameter and the performance parameter can be obtained. Then, combining the weight of each network speed evaluation parameter and each performance parameter, and the value of at least one network speed evaluation parameter in the first test result and the value of each performance parameter in the performance data, first network communication quality representing the network communication quality is determined, and the first network communication quality can be a network communication quality score or a quality level, etc.

For example, the first test result includes: the values of packet loss, delay and jitter, and the performance data packet includes load values corresponding to the load. However, packet loss has a greater impact on network communication quality, and the weight of packet loss can be the highest, followed by the weight of jitter, and the weight of delay and load is the lowest. On this basis, the network quality scores represented by packet loss, delay, jitter and load can be determined respectively, and then the network quality scores of these parameters are weighted and summed to obtain the network quality score of the first network communication quality.

S407: Determine a second network communication quality to the access node via the mobile network based on the second test result and the performance data.

Similar to S406, the acceleration client may calculate the second network communication quality based on the second test result and the performance data; it is also possible that the second test result and the performance data are transmitted to the acceleration server, and the second network communication quality is calculated by the acceleration server based on the second test result and the performance data and returned to the acceleration client.

The acceleration server can also determine the second network communication quality according to set weight coefficients of test results and performance data and in combination with the second test result and the performance data. The process of calculating the second network communication quality is similar to the process of calculating the first network communication quality, which will not be described in detail herein.

It is to be noted that the above-mentioned S404 to S407 are implementation methods for respectively acquiring network communication qualities to the access node via the near field wireless communication network and the mobile network, and in practical applications, acquiring network communication qualities of the two network transmission paths by other ways is also applicable to this disclosure, without limitation.

In addition, the sequence of S406 and S407 is not limited to that shown in FIG. 4, and in practical applications these two steps may be interchanged or performed simultaneously.

S408: Detect whether there is an access node without being tested in the access node list, and if so, return to S403; and if not, execute S409.

S409: Select the first access node with the optimal first network communication quality with the near field wireless communication network from the plurality of nodes, and configure the first network transmission path to the first access node via the near field wireless communication network.

S410: Select the second access node with the optimal network communication quality with the mobile network from the plurality of nodes, and configure the second network transmission path to the second access node via the mobile network.

In this embodiment, taking a case that the first network communication quality satisfies the condition that the first network communication quality is optimal, and the second network communication quality satisfies the condition that the second network communication quality is optimal as an example, but the other cases that the network communication quality satisfies the condition are also applicable to the present embodiment.

There may be multiple specific ways for configuring the first network transmission path, for example, the first access node may be configured as an access node which accesses a network acceleration channel via the mobile network, namely, the first access node is configured as an access node bound by the near field wireless communication network, so as to configure the first network transmission path to the first access node via the mobile network for the application.

Similarly, there may be multiple specific ways of configuring the second network transmission path. For example, the second access node may be configured as an access node which accesses the network acceleration channel via the mobile network, so as to configure the second network transmission path to the second access node via the mobile network for the application.

It is to be noted that the sequence of S409 and S410 is not limited to that shown in FIG. 4, and in practical applications these two steps may be performed simultaneously or the sequence may be interchanged.

It can be seen from FIG. 4 that with regard to each access node in the access node list available to the application, the network communication qualities of the near field wireless communication network and the mobile network to the access node will be acquired. On this basis, with regard to each local network (the near field wireless communication network or the mobile network) accessed by the mobile terminal side, the access node with the optimal network communication quality with the local network in the access node list will be configured as an access node of the local network access network acceleration channel, so that each local network can access the network acceleration channel via the configured optimal access node, and as a result, an optimal application acceleration effect can be obtained, and abnormal situations such as a stuck or even disconnection of the application can be reduced.

In a case that the set access nodes in the first network transmission path and the second network transmission path configured by the acceleration client for the application are different, if the target network transmission path with the optimal network communication quality is determined according to the network communication qualities of the first network transmission path and the second network transmission path, the intercepted data packet can be transmitted to the target access node in the target network transmission path via the target network transmission path. Accordingly, the target access node may transmit the data packet to the program server through the connected network acceleration channel.

It is to be understood that in order to reduce the situation that the application is stuck or even disconnected due to switching network acceleration channels, the exit node in each network acceleration channel in this disclosure is connected to a fixed pair of outbound transit nodes. Accordingly, the target access node can transmit the data packet to the program server via the connected network acceleration channel and the outbound transit node.

Figure 5:
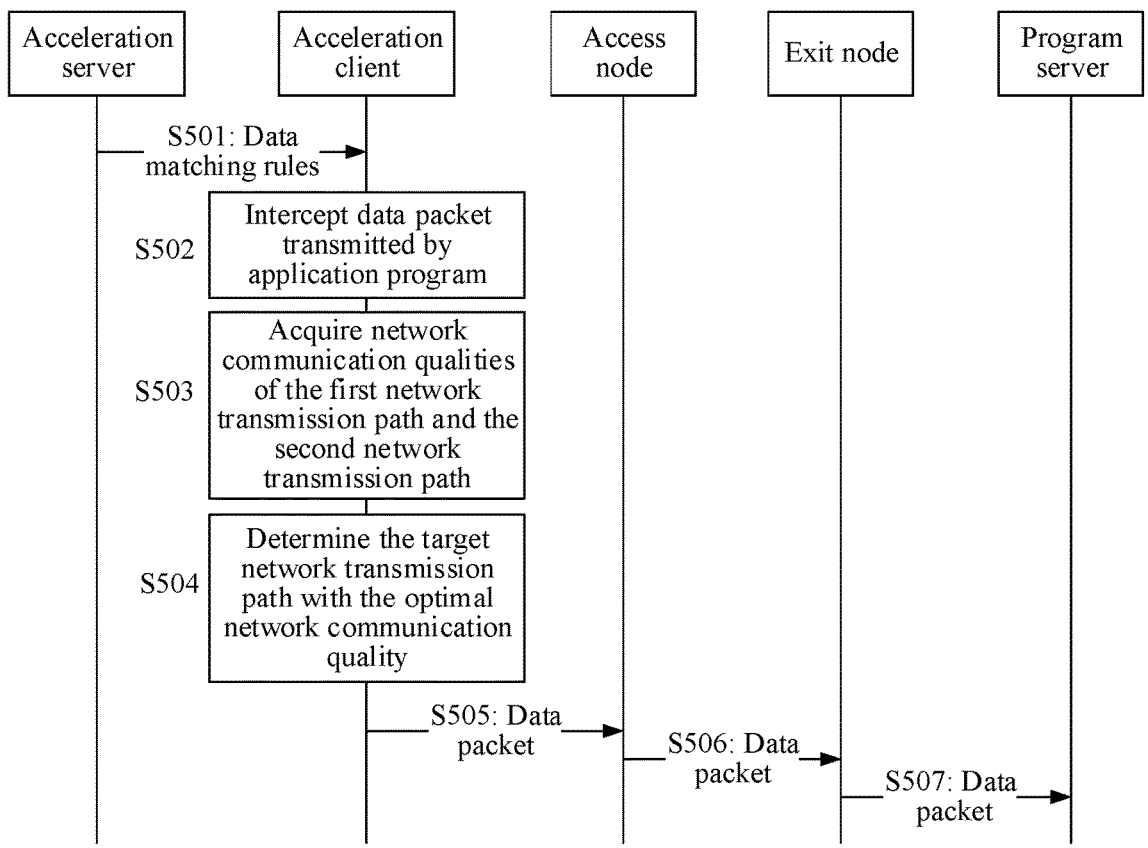
FIG. 5 is a flow interaction schematic diagram of an application acceleration method according to an embodiment of this disclosure.

In order to facilitate understanding, the application acceleration method of this disclosure will be described below by taking a case as an example. FIG. 5 is a flow interaction schematic diagram of an application acceleration method according to this disclosure. The method of the present embodiment may include the following steps.

S501. Acquire the data matching rules corresponding to the application to be accelerated from the acceleration server through the acceleration client.

The data matching rules include: a domain name matching rule and an IP matching rule.

The domain name matching rule is a rule constructed using a regular expression, for example, the regular expression of the domain name matching rule can be: .*\.aa\.cn.

In this embodiment, the data matching rule corresponding to the application defines the characteristics of the IP address or domain name corresponding to the data packet needing accelerated transmission in the application.

It is to be understood that, in the case that the data packet is a data packet adopting Hyper Text Transfer Protocol (HTTP) or Hyper Text Transfer Protocol over Secure Socket Layer (HTTPS), the address information indicating the destination address in the data packet is a domain name. Thus, the domain name matching rules are configured to match data packets using the HTTP or HTTPS protocols.

The IP matching rule includes an IP address field composed of a reference IP and a subnet mask group. The reference IP is an IP address defined, which can be set as needed.

For example, the IP matching rule may be: 1.2.3.0, mask: 255.255.255.0. The reference IP is 1.2.3.0, the subnet mask is 255.255.255.0, and the IP address field determined by the reference IP and the subnet mask is an IP address field from IP: 1.2.3.0 to IP: 1.2.3.225.

It is to be understood that when the data packet is a data packet using an IP protocol, the address data carried by the data packet for indicating a destination address is the IP address, and therefore the IP matching rule is configured to match the data packet using the IP protocol.

It is to be understood that the acceleration client may acquire the data matching rule corresponding to the application after determining the application to be accelerated or after launching the application.

In an alternative embodiment, in order to be able to timely intercept the data packet transmitted to the program server by the application after the application is started, this disclosure can acquire the data matching rule corresponding to the application after the application to be accelerated is determined, and start the application after the first network transmission path and the second network transmission path are configured for the application after execution.

The specific manner for determining the application to be accelerated may be as previously indicated at S401. For example, after the application to be accelerated is determined in S401, the data matching rule of the application is acquired, wherein the sequence of acquiring the data matching rule of the application and acquiring the access node list may not be limited, for example, the operation of acquiring the data matching rule of the application may be performed while acquiring the access node list.

It is to be noted that in the embodiment, taking the acceleration client acquiring the data matching rule of the application from the acceleration server as an example, if the data matching rule corresponding to the application is stored in advance in the acceleration client, the acceleration client can directly acquire the data matching rule locally.

For example, if the application belongs to an application that the acceleration client determines to be accelerated within a set period of time before the current moment, the acceleration client may store the data matching rule of the application, and the acceleration client may directly obtain the data matching rule locally.

S502: Intercept a data packet matched with the data matching rule corresponding to the application through the acceleration client so as to obtain the data packet transmitted by the application to the program server.

The application runs in the mobile terminal with the acceleration client.

Accordingly, the data packet matching the data matching rule is: a data packet containing a domain name matching the regular expression, or a data packet containing an IP address belonging to the IP address field.

It is to be understood that before the acceleration client intercepts the data packet for the application, the acceleration client may start the application, such as the acceleration client transmitting a request to the operating system to start the application and starting the application through the operating system.

There are many specific possible ways for the acceleration client to intercept the data packet.

In a possible implementation, the acceleration client may create a virtual network interface card in the mobile terminal, and on this basis, network data packets which are to be sent out by the mobile terminal will be sent to the virtual network interface card first, so that the network data packets to be sent out by the mobile terminal can be intercepted by the virtual network interface card.

Accordingly, the mobile terminal parses the protocol used by the intercepted network data packet, and if the protocol used by the data packet is an IP protocol, the mobile terminal will detect whether the IP address in the network data packet belongs to the IP address field defined in the IP matching rule. If the network data packet belongs to the IP address field, it is determined that the network data packet is the data packet transmitted by the application to the program server, and the data packet belongs to the data packet needing accelerated transmission.

If the protocol used to parse the network data packet is a HTTP or HTTPS protocol, whether the network data packet matches the regular expression in the domain name matching rule is detected; if the network data packet matches the regular expression in the domain name matching rule, it is determined that the network data packet is a data packet transmitted by the application to the program server, and the data packet belongs to a data packet needing accelerated transmission.

By way of example, the IP matching rule of: 1.2.3.0, mask: 255.255.255.0 is also taken as an example, the IP address field determined by the IP matching rule is an IP address field from IP: 1.2.3.0 to IP: 1.2.3.225; it is assumed that the intercepted network data packet is a data packet using an IP protocol, and the IP in the network data packet is: 1.2.3.4; because IP: 1.2.3.4 belongs to the IP address field, it can confirm that the data packet transmitted out by the application is intercepted.

Similarly, it is assumed that the regular expression of the domain name matching rule can be: .*\.aa\.com; if the intercepted network data packet is a data packet using HTTP/HTTPS, then it is assumed that the domain name in the network data packet is: WWW.aa.com, then the domain name matches the regular expression, so it can confirm that the data packet transmitted out by the application is intercepted.

It is to be understood that if the network data packet intercepted by the acceleration client through the virtual network interface card does not match the data matching rule, the acceleration client may not process the network data packet.

S503: Acquire the network communication qualities of the first network transmission path and the second network transmission path configured for the application through the acceleration client.

The first network transmission path is a communication path to the first access node via the near field wireless communication network accessed by the mobile terminal. The second network transmission path is a communication path to the second access node via the mobile network accessed by the mobile terminal.

The network acceleration channels respectively accessed by the first access node and the second access node are different, and the network acceleration channels respectively accessed by the first access node and the second access node all communicate with the program server via the same outbound transit node.

S504: Determine the target network transmission path with the optimal network communication quality among the first network transmission path and the second network transmission path via the acceleration client.

Similar to the previous embodiment, the acceleration client, after determining the application to be accelerated, can test the network communication qualities of the first network transmission path and the second network transmission path configured for the application when the network test condition is satisfied. On this basis, if the acceleration client confirms to be in an acceleration state (for example, after the application to be accelerated is determined, and if an indication to end acceleration is not received, the acceleration client is in an acceleration state), the acceleration client may continuously monitor and detect the network communication qualities of the two network transmission paths, so that the acceleration client directly obtains a target network transmission path with the most recently tested optimal network communication quality after intercepting the data packet.

In this embodiment, testing the network communication quality of the network transmission path may be similar to the previous process of testing the network communication quality of the mobile terminal or the near field wireless communication network to the access node in the embodiment in FIG. 4.

It is to be understood that obtaining the network communication quality after configuring the access nodes for the mobile network and the near field wireless communication network to be accessed by the mobile terminal, respectively, is essentially to obtain the network conditions of the mobile network and the near field wireless communication network, and therefore the network communication quality tested in this embodiment may not include the performance data of the access nodes on the network transmission path.

In one example, in order to be able to more flexibly configure a computing strategy of network communication quality, etc., the network communication quality of the first network transmission path configured for the application can be tested as follows: performing network speed measurement on the access node via the near field wireless communication network accessed by the mobile terminal to obtain a first value of at least one network speed evaluation parameter via the acceleration client; and transmitting the first value of the at least one network speed evaluation parameter to an acceleration server. Accordingly, the network communication quality score for the first network transmission path returned by the acceleration server may be received.

The network communication quality score of the first network transmission path is a score calculated according to the weights of different network speed evaluation parameters and in combination with the first value of the at least one network speed evaluation parameter. For example, the network speed evaluation parameters may be packet loss, delay, jitter, etc.

Similarly, the network communication quality of the second network transmission path may be tested as follows: performing, by the acceleration client, network speed measurement on the access node accessed by the mobile terminal to obtain a second value of at least one network speed evaluation parameter via the mobile network; and transmitting the second value of the at least one network speed evaluation parameter to the acceleration server. Accordingly, the network communication quality score for the second network transmission path returned by the acceleration server may be received.

The network communication quality score of the second network transmission path is a score calculated according to weights of different network speed evaluation parameters and in combination with the second value of at least one network speed evaluation parameter. The specific implementation of the above S503 and S504 can be referred to the related description of the previous embodiments, and will not be described in detail herein.

S505: Transmit the data packet to the target access node in the target network transmission path via the acceleration client using the target network transmission path.

In order to facilitate distinguishing, the access node in the transmission path of the target network is referred to as a target access node. For example, it is assumed that the target network transmission path is the first network transmission path, the target access node is the first access node; If the target network transmission path is the second network transmission path, the target access node is the second access node.

S505: Transmit the data packet to the target exit node corresponding to the configured network acceleration channel via the target access node.

S506: Transmit the data packet to the outbound transit node via the target exit node.

S507: Transmit the data packet to the program server via the outbound transit node.

In the embodiment in FIG. 5, on the basis that the acceleration client configures the optimal access nodes respectively applicable to the near field wireless communication network and the mobile network for the application, this disclosure also determines a local network with the optimal current communication quality of the mobile terminal by acquiring the network communication qualities of network transmission channels corresponding to the near field wireless communication network and the mobile network respectively, and transmits the data packet of the application to the network acceleration channel configured for the local network based on the local network with the optimal communication quality at the mobile terminal side. Therefore, not only the optimal network acceleration channel can be configured to reduce the situation of blocking and disconnecting caused by the continuous switching of the operator network, but also the influence of the fluctuation of the local network of the mobile terminal on the data transmission and communication of the application can be taken into account, so that the running stability of the application can be reliably improved and the situation of blocking and disconnection of the application can be reduced.

In addition, since the data packet of the application is transmitted through only one network acceleration channel at a time, rather than transmitting the data packet to both network acceleration channels, the power consumption on the mobile terminal side and the bandwidth resource consumption can be reduced.

In order to facilitate an understanding of the solution of this disclosure, the application scenario is exemplified with the application as a game application, and the acceleration client as a game acceleration client.

In this application scenario, the access nodes in the two network transmission paths of the game configuration are illustrated differently. Meanwhile, in this application scenario, the near field wireless communication network accessed by the mobile terminal is taken as a Wi-Fi network as an example.

Figure 6:
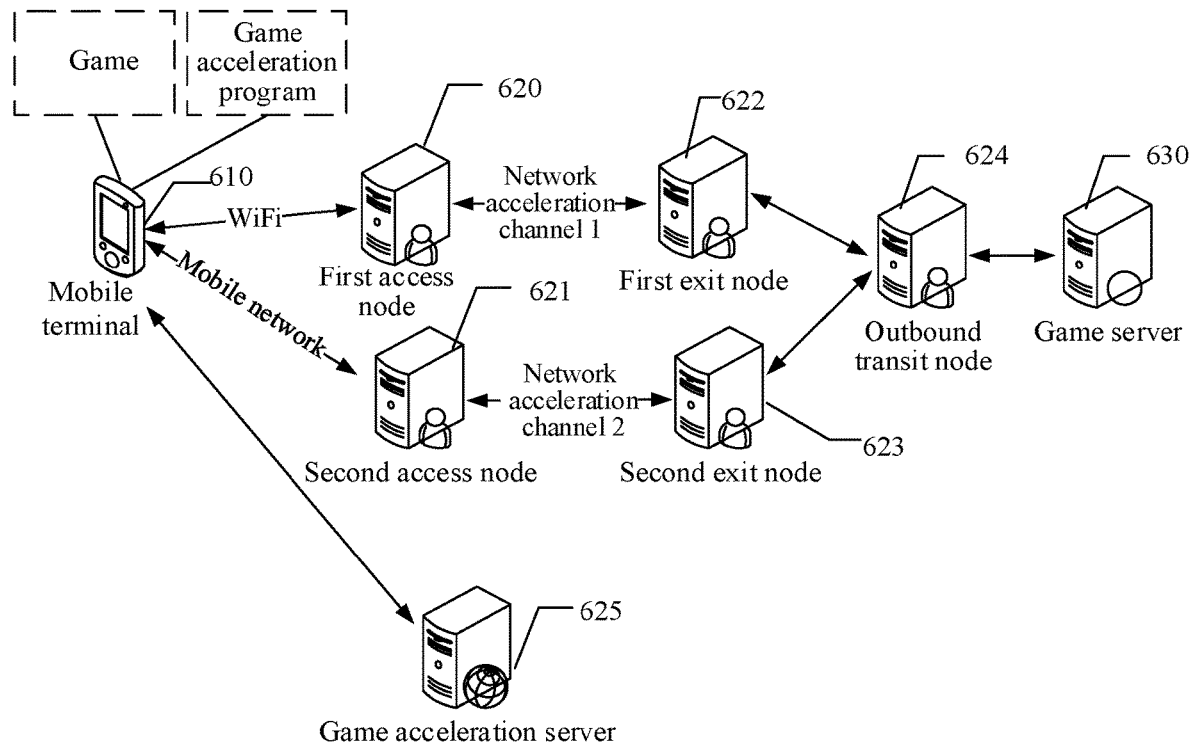
FIG. 6 is a schematic diagram of a component architecture of an application scenario applicable to a solution according to an embodiment of this disclosure.

FIG. 6 is a schematic diagram of a component architecture of an application scenario applicable to a solution according to this disclosure.

In the scenario shown in FIG. 6, a game acceleration client is installed and run on a mobile terminal 610, and a game application can be launched and run on the mobile terminal through the game acceleration client.

In the application scenario in FIG. 6, the game acceleration client configures the game with a first access node 620 adapted for the Wi-Fi network and a second access node 621 adapted for the mobile network.

The first access node 620 is configured with a first exit node 622, and the first access node and the first exit node form a network acceleration channel, such as the network acceleration channel 1 in FIG. 6.

The second access node 621 is configured with a second exit node 623, and a second network acceleration channel, such as a network acceleration channel 2 in FIG. 6, is formed between the second access node and the second exit node.

The first exit node and the second exit node are both connected to an outbound transit node 624 via a network. In addition, the outbound transit node 624 can be connected to a game server 630 corresponding to a game application running on the mobile terminal via the network.

Meanwhile, the mobile terminal may be connected to a game acceleration server 625 through the game acceleration client. The game acceleration server may have one or more, without limitation. The game acceleration server may store data matching rules corresponding to different game applications; The game acceleration server also stores: the corresponding relationship between different geographical location ranges, games and access nodes.

Figure 7:
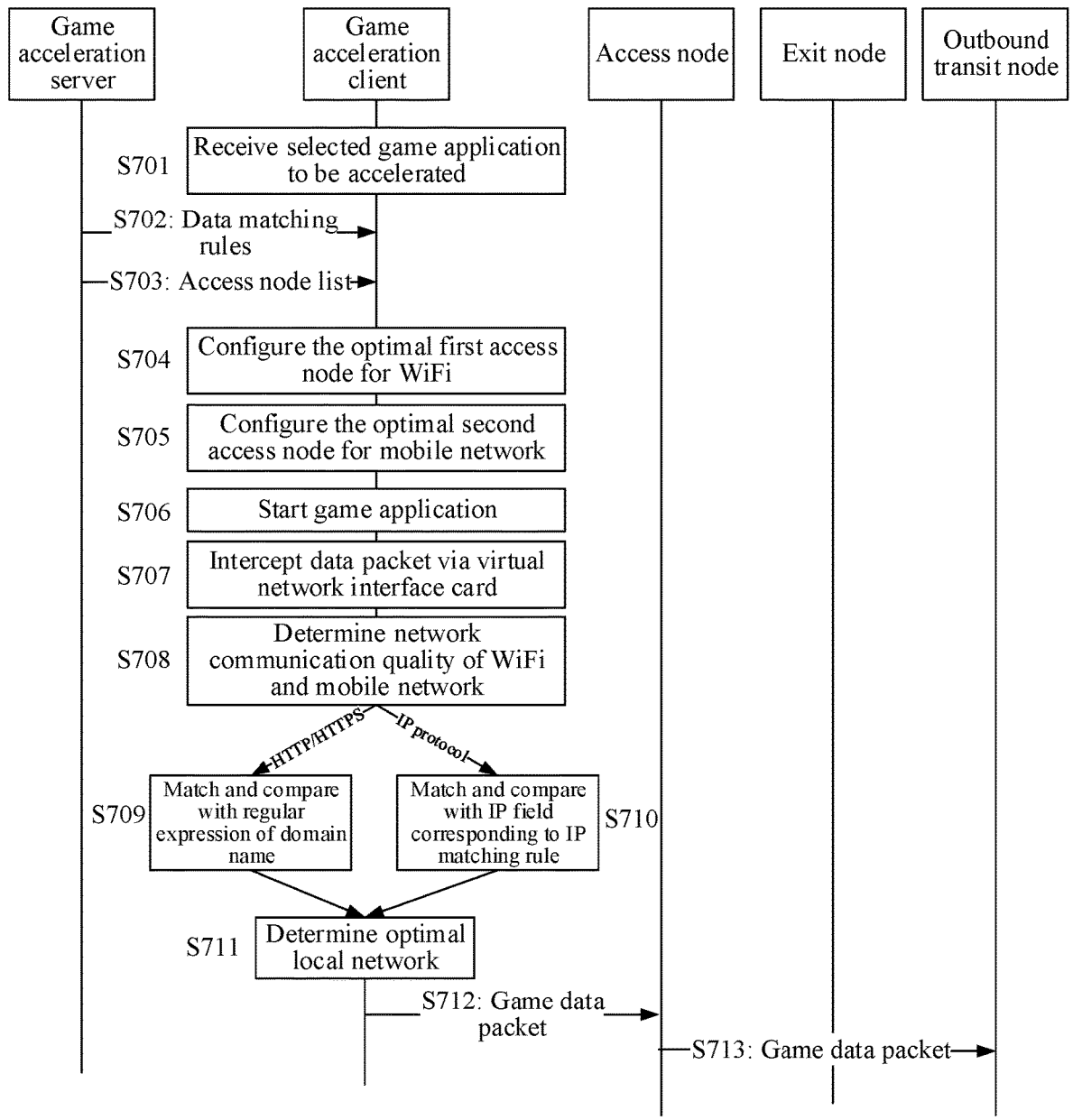
FIG. 7 is a flow interaction schematic diagram of an application acceleration method according to this disclosure in an application scenario.

With reference to FIG. 7, the specific implementation flow of the application acceleration method of this disclosure in the application scenario shown in FIG. 6 is described below.

FIG. 7 is a flow interaction schematic diagram of an application acceleration method in an application scenario according to this disclosure. The method of the present embodiment may include the following steps.

S701: Receive the game application selected by a user in a game acceleration selection interface via the game acceleration client, and determine the game application as the game application to be accelerated.

Figure 8:
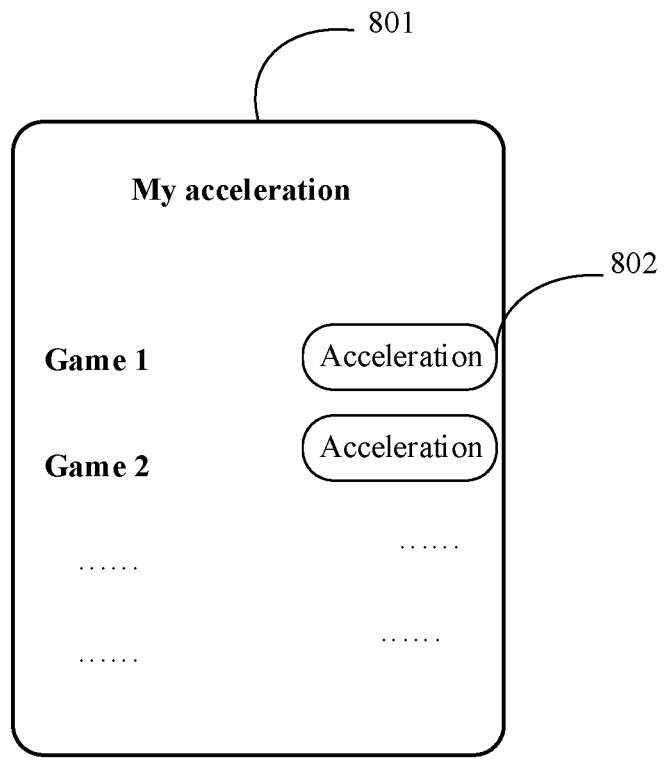
FIG. 8 is a schematic diagram of a game acceleration selection interface output by a game acceleration client according to an embodiment of this disclosure.

FIG. 8 is a schematic diagram of a game acceleration selection interface output by a game acceleration client according to this disclosure.

As shown in FIG. 8, the game acceleration selection interface 801 displays the names (or icons) of a plurality of game applications available for acceleration in the mobile terminal, and the name of each game corresponds to an "accelerate" button 802. If the user clicks the "accelerate" button 802 corresponding to a certain game application, the game acceleration client will confirm that the game application is the game application to be accelerated.

S702: Acquire the data matching rule of the game application from the game acceleration server via the game acceleration client.

The data matching rules include: a domain name matching rule and an IP matching rule.

The domain name matching rule is a rule constructed using a regular expression, and the IP matching rule includes an IP address field composed of a reference IP and a subnet mask group.

S703: Request an access node list applicable to the game application from the game acceleration server S703 via the game acceleration client.

The list access nodes include at least one access node.

For example, the game acceleration client transmits a node list request to the game acceleration server, and the node list request may carry identification information such as an IP address of the game acceleration client and a name of the game application. Accordingly, the game acceleration server may determine at least one access node applicable to the game application according to the geographical location area corresponding to the IP address and the name of the game application, and return the access node list containing the at least one access node to the game acceleration client.

It is to be understood after the game acceleration client determines the game application to be accelerated, the game acceleration client enters a game acceleration preparation phase. In the game acceleration preparation stage, the game acceleration client acquires the access node list and the data matching rule corresponding to the game, and also performs relevant operations of configuring an optimal access node for the Wi-Fi accessed by the mobile terminal and the mobile terminal.

Figure 9:
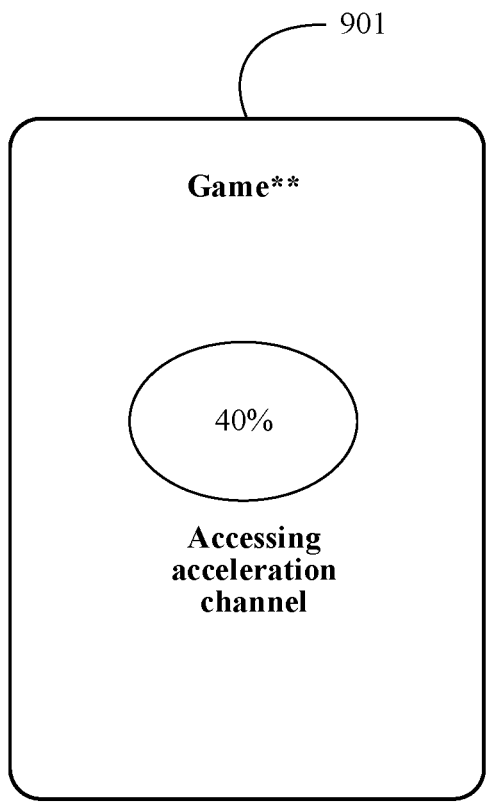
FIG. 9 is a schematic diagram of an acceleration preparation interface output by a game acceleration client.

FIG. 9 shows an interface schematic diagram of a game acceleration client in a game acceleration preparation stage.

After the game acceleration client confirms the game application to be accelerated, the game acceleration client switches from the game acceleration selection interface 801 to an acceleration preparation interface 901 in FIG. 9. The acceleration preparation interface may display the progress of the game acceleration client to complete the game acceleration preparation, such as "40%" shown in FIG. 9.

It is to be noted that the sequence of the above S702 and S703 may be interchanged or performed at the same time, without limitation.

S704: Respectively test the network communication quality from the accessed Wi-Fi network to each access node in the access node list via the game acceleration client, and configure the first access node having the optimal network communication quality with the Wi-Fi network for the Wi-Fi network.

The first access node belongs to the access node in the access node list.

S705: Respectively test the network communication quality from the accessed mobile network to each access node in the access node list via the game acceleration client, and configure the second access node having the optimal network communication quality with the mobile network for the mobile network.

The second access node belongs to the access node in the access node list.

The above S704 and S705 can be described with reference to the embodiment in FIG. 4 and will not be described in detail herein.

S706: Start the game application in the mobile terminal via the game acceleration client.

In one implementation, the game acceleration client may receive a start instruction for the game application and start the game application in response to the start instruction.

Figure 10:
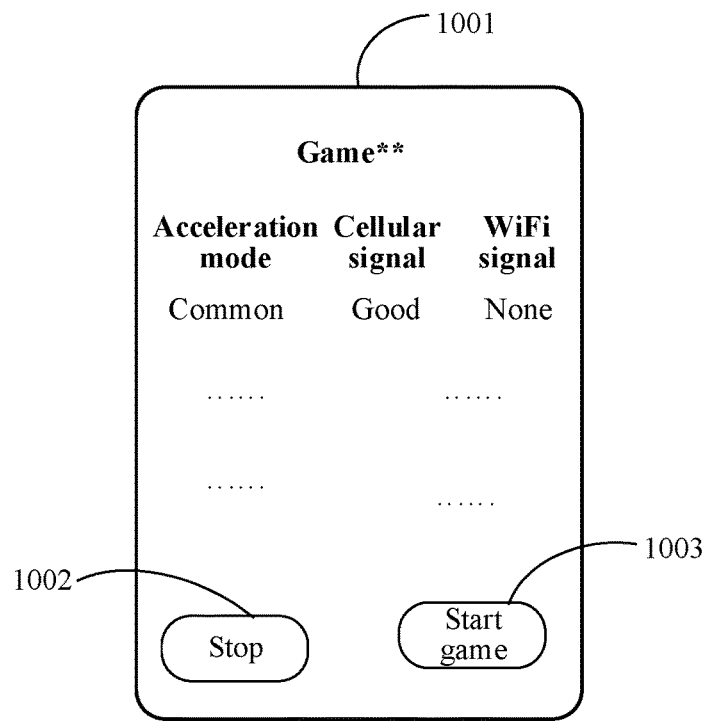
FIG. 10 is a schematic diagram of an acceleration detail interface output by a game acceleration client.

For example, after the game acceleration client completes the game acceleration preparation operations corresponding to the above S702 to S706, the game acceleration client switches from the acceleration preparation interface 901 in FIG. 9 to an acceleration detail interface 1001 shown in FIG. 10.

Some of the acceleration effects achieved in the acceleration preparation phase are shown in the acceleration detail interface in FIG. 10. Meanwhile, a "Stop" option 1002 for indicating that the game acceleration is ended and a "Start Game" option 1003 for indicating that the game application is started are displayed in the acceleration detail interface. If the user clicks on the "Start Game" option, the game acceleration client will start the game application.

S707: Create a virtual network interface card in the mobile terminal via the game acceleration client, and intercept the data packet transmitted by the mobile terminal using the virtual network interface card.

S708: Monitor the network communication quality of the Wi-Fi network to the first access node and network communication quality of the mobile network to the second access node while the game acceleration client is in the acceleration mode.

If the game acceleration client does not receive the indication to stop acceleration, the game acceleration client is in the acceleration mode until game running is finished, or the "Stop" option as shown in FIG. 10 is detected to be touched.

The operation of determining the network communication quality in the S708 may be the same as that in the previous step, but for a different purpose, and the purpose of testing the network communication quality in S708 is to determine which communication quality is better between the Wi-Fi network and the mobile network.

S709: Detect whether the domain name in the data packet matches the regular expression in the domain name matching rule via the game acceleration client if the virtual network interface card intercepts the data packet using the HTTP/HTTPS protocol, and if so, confirm that the data packet is the game data packet transmitted by the game application and execute S711; and if not, skip processing the data packet.

S710: Detect whether the IP address in the game packet belongs to the IP address field determined by referring to a domain name and a subnet mask in the IP matching rule via the game acceleration client if the virtual network interface card intercepts the data packet using the IP protocol, and if so, confirm that the data packet is the game data packet transmitted by the game application, and execute S711; and if not, skip processing the data packet.

S711: Determine a target local network with the optimal network communication quality in the accessed mobile network and Wi-Fi network via the game acceleration client according to the network communication quality from the Wi-Fi network to the first access node and the network communication quality from the mobile network to the second access node. S712: Transmit the game data packet to the target access node configured for the target local network via the game acceleration client using the target local network.

For example, if the target local network is the Wi-Fi network, an access node matching the Wi-Fi configured by the game acceleration client for the game application can be obtained, and the access node is assumed to be an access node 1, and the game data packet is transmitted to the access node 1 via the Wi-Fi network.

S713: Transmit the game data packet to the external forwarding node by the game acceleration client using the network acceleration channel configured by the target access node so that the external forwarding node transmits the game data packet to the game server.

It is to be noted that as shown in FIG. 7, the game application is taken as the application for illustrating to facilitate understanding, but it is to be understood that the embodiment in FIG. 7 is also applicable to the case that the application is another application, and the detailed implementation principle thereof is similar to that in FIG. 7, and the description thereof will not be repeated herein.

It is to be understood that in the above embodiments of this disclosure, the data matching rule corresponding to the application merely includes the domain name characteristic or IP characteristic of the data packet needing to be accelerated as an example for illustrating. However, in practical applications, the data matching rule may also include both a first domain name matching rule and a first IP matching rule corresponding to the data packet needing accelerated transmission in a game, and a second domain name matching rule and a second IP matching rule corresponding to the data packet not needing accelerated transmission in a game.

The first domain name matching rule and the second domain name matching rule are different, and the first IP matching rule is different from the second IP matching rule. For example, the first domain name matching rule and the second domain name matching rule can be respectively configured to match regular expressions of different domain names. In the first IP matching rule and the second IP matching rule, one or both of the reference IP and the subnet mask may be different.

Accordingly, if the data packet matching the first domain name matching rule or the first IP matching rule is acquired, a target network transmission path is determined according to the method of any one of the above embodiments of this disclosure, and the data packet is transmitted to the access node of the target network transmission path via the local network corresponding to the target network transmission path, so that the access node can transmit the data packet to the program server via the network acceleration channel accessed by the access node.

If the second domain name matching rule or the second IP matching rule is intercepted, the data packet may be transmitted directly to the program server by the application.

For example, the first domain name matching rule is a first regular expression: .*\.aa\.com, and the strategy corresponding to the first domain name matching rule is to accelerate transmission.

The second domain name matching rule is a second regular expression: .* aa.co.*, and the strategy corresponding to the second domain name matching rule is direct transmission.

On this basis, it is assumed that the domain name in the data packet matches the first regular expression in the first domain name matching rule, the data packet needs to be transmitted to the program server via the network acceleration transmission channel in the manner of the above embodiments of this disclosure.

However, if the domain name in the data packet matches the second regular expression of the second domain name matching rule, it indicates that the data packet belongs to the data packet transmitted by the application to the program server, but the data packet belongs to the data packet which does not need accelerated transmission. In this case, the data packet may then be transmitted by the application directly to the program server, and is not transmitted by the data packet over a network accelerated transmission channel.

According to the application acceleration method in this disclosure, this disclosure also provides an application acceleration apparatus, wherein the mobile terminal involved accesses the near field wireless communication network and the mobile network.

Figure 11:
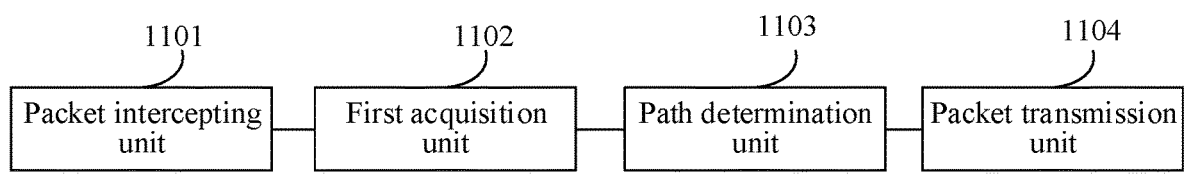
FIG. 11 is a schematic diagram of a component structure of an application acceleration apparatus according to an embodiment of this disclosure.

FIG. 11 is a schematic diagram of a component architecture of an application acceleration apparatus according to this disclosure, and the apparatus includes:

an acquisition unit 1101 configured to acquire a data packet transmitted by an application to a program server, the application running in the mobile terminal;

a first quality acquisition unit 1102 configured to determine network communication qualities of a first network transmission path and a second network transmission path configured for the application, the first network transmission path being a communication path to a set access node via the near field wireless communication network, the second network transmission path being a communication path to the set access node via the mobile network, and the set access node being an access node configured for the application and configured to access a network acceleration channel;

a path determination unit 1103 configured to determine a target network transmission path from the first network transmission path and the second network transmission path with an optimal network communication quality; and a packet transmission unit 1104 configured to transmit the data packet to the set access node via the target network transmission path such that the set access node transmits the data packet to the program server through the accessed network acceleration channel.

In a possible implementation, the apparatus further includes:

a quality test unit configured to test network communication qualities of the first network transmission path and the second network transmission path in a case that a network test condition is satisfied; and a first quality acquisition unit specifically configured to acquire the network communication qualities of the first network transmission path and the second network transmission path obtained by a latest test.

In an alternative embodiment, the quality test unit includes:

a first speed measurement unit configured to perform network speed measurement on the access node via the near field wireless communication network to obtain a first value of at least one network speed evaluation parameter;

a first parameter transmission unit configured to transmit the first value of the at least one network speed evaluation parameter to the acceleration server;

a first score receiving unit configured to receive a network communication quality score of the first network transmission path returned by the acceleration server, the network communication quality score of the first network transmission path being a score calculated according to weights of different network speed evaluation parameters and in combination with the first value of the at least one network speed evaluation parameter;

a second speed measurement unit configured to perform network speed measurement on the access node via the mobile network to obtain a second value of at least one network speed evaluation parameter;

a second parameter transmission unit configured to transmit the second value of the at least one network speed evaluation parameter to the acceleration server; and a second score receiving unit configured to receive a network communication quality score of the second network transmission path returned by the acceleration server, the network communication quality score of the second network transmission path being a score calculated according to weights of different network speed evaluation parameters and in combination with the second value of the at least one network speed evaluation parameter.

In a possible implementation, the set access node includes a first access node and a second access node; the first network transmission path is a communication path to the first access node via the near field wireless communication network;

the second network transmission path is a communication path to the second access node via the mobile network; and the network acceleration channels respectively accessed by the first access node and the second access node are different, and the network acceleration channels respectively accessed by the first access node and the second access node all communicate with the program server via a same outbound transmit node.

In a possible implementation, the first access node is an access node, which satisfies a condition for network communication quality with the near field wireless communication network, of a plurality of access nodes; the plurality of access nodes are configured to improve a data transmission rate for the application; and The second access node is an access node, which satisfies a condition for network communication quality with the mobile network, of the plurality of access nodes.

In yet another possible implementation, the apparatus further includes:

an application determination unit configured to receive a program selection instruction inputted in a program selection interface, the program selection interface displaying information about at least one candidate application available for selection, the program selection instruction being configured to indicate the application in the at least one candidate application;

a list acquisition unit configured to acquire an access node list available for the mobile terminal to run the application, the access node list including a plurality of access nodes for improving a data transmission rate of the application;

a second quality acquisition unit configured to respectively acquire network communication quality to plurality of access node via the near field wireless communication network and the mobile network;

a first node configuration unit configured to select the first access node, which satisfies a condition for network communication quality with the near field wireless communication network, from the plurality of access nodes, and configure the first access node to be an access node which accesses the network acceleration channel via the near field wireless communication network; and a second node configuration unit configured to select the second access node, which satisfies a condition for network communication quality with the mobile network, from the plurality of access nodes, and configure the second access node to be an access node accessing a network acceleration channel via the mobile network.

In an alternative embodiment, the second quality acquisition unit includes:

a first test unit configured to perform a network quality test on the access node via the near field wireless communication network to obtain a first test result a second test unit configured to perform a network quality test on the access node via the mobile network to obtain a second test result;

a first quality determination unit configured to determine a first network communication quality to the access node via the near field wireless communication network based on the first test result and performance data of the access node; and a second quality determination unit configured to determine a second network communication quality to the access node via the mobile network based on the second test result and performance data.

In yet another possible implementation, the apparatus further includes:

a rule acquisition unit configured to acquire a corresponding data matching rule to be accelerated before the data packet transmitted to the server is intercepted, the data matching rule including: a domain name matching rule and an IP matching rule, wherein the domain name matching rule is a rule constructed using a regular expression, and the IP matching rule includes an IP address field composed of a reference IP and a subnet mask group; and a packet acquisition unit specifically configured to determine a data packet matching the data matching rule as the data packet transmitted to the server, the data packet matching the data matching rule being: a data packet containing the domain name matching the regular expression, or a data packet containing an IP address belonging to the IP address segment.

Figure 12:
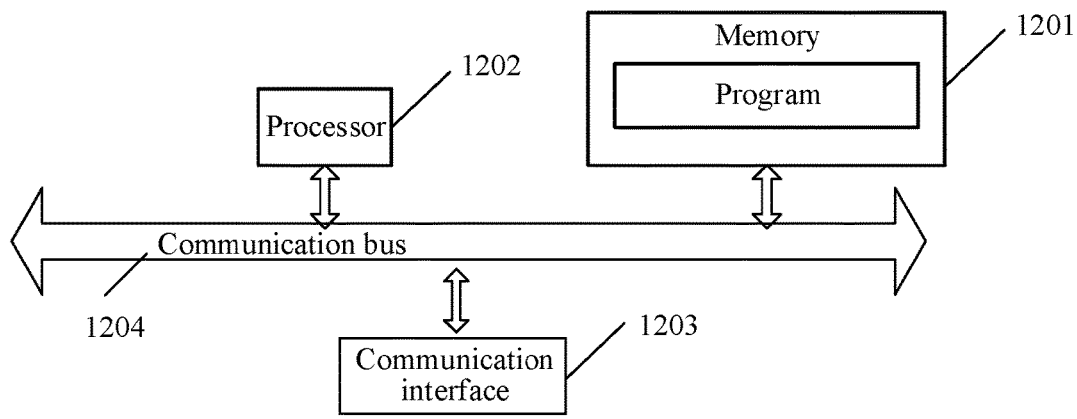
FIG. 12 is a schematic diagram of a component structure of a mobile terminal according to an embodiment of this disclosure.

FIG. 12 is a structural diagram of an implementation mode of a mobile terminal according to an embodiment of this disclosure, the mobile terminal may include:

A memory 1201 (i.e., a non-transitory computer-readable storage medium) configured to store a program; and a processor 1202 (processing circuitry) for calling and executing a program stored in the memory, and the program being specifically configured to execute the application acceleration method provided by any one of the preceding embodiments.

The processor 1202 may be a central processing unit CPU, or an application specific integrated circuit (ASIC).

The mobile terminal may also include a communication interface 1203 and a communication bus 1204 through which the memory 1201, the processor 1202 and the communication interface 1203 communicate with each other.

The embodiments of this disclosure also provide a readable storage medium, storing a computer program for being loaded and executed by the processor to implement the steps of the above-mentioned application acceleration method, and the specific implementation process can be described with reference to the corresponding parts of the above-mentioned embodiments, and this embodiment will not be described in detail herein.

This present disclosure also provides a computer program product or computer program is provided; the computer program product or the computer program includes the computer instruction, and the computer instruction is stored in the computer-readable storage medium. The processor of a computer device reads the computer instruction from the computer-readable storage medium, and the processor executes the computer instruction so that the computer device executes the method provided in the various alternative implementations of the method in the application acceleration method or the application acceleration apparatus, with reference to the corresponding embodiments described above, and will not be described in detail herein.

The application acceleration method, apparatus, device and storage medium provided in this disclosure are described in detail above, and the principles and implementations of this disclosure are described herein using specific examples. The above description of the embodiments is only for helping to understand the method and the core idea of this disclosure; Meanwhile, for a person of ordinary skill in the art, according to the idea of this disclosure, there may be changes in the specific implementations and the disclosure scope, and in summary, the contents of the present description should not be construed as limiting this disclosure.

It is to be noted that the embodiments in this disclosure are all described in a progressive manner. Descriptions of each embodiment focus on differences from other embodiments, and same or similar parts among respective embodiments may be mutually referenced. At the same time, the features disclosed in the various embodiments in the description may be replaced or combined with each other to enable a person skilled in the art to make or use this disclosure. The apparatus disclosed in the embodiments is relatively simple to describe, since it corresponds to the method disclosed in the embodiments, with reference to the description in the method section.

It is further to be noted that in this specification, the relational terms such as first and second are used only to differentiate an entity or operation from another entity or operation, and do not require or imply any actual relationship or sequence between these entities or operations. Furthermore, the terms "including", "comprising", or any other variation thereof, are intended to cover a non-exclusive inclusion, such that a process, method, article, or apparatus that includes a list of elements does not, or does not, include elements that are inherent to such process, method, article, or apparatus. An element proceeded by "include a" does not, without more constraints, preclude the existence of additional identical elements in the process, method, article, or apparatus that includes the element.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An application acceleration method performed by a mobile terminal, the method comprising:
    identifying a data packet to be transmitted by an application running on the mobile terminal as a data packet to be accelerated to an application server, wherein the mobile terminal is configured to access a wireless local area network (LAN) communication network and a mobile network;
    determining network communication qualities of a first network transmission path and a second network transmission path associated with the application, the first network transmission path being a communication path to an access node via the wireless LAN communication network, the second network transmission path being a communication path to the access node via the mobile network, wherein the access node is configured to access a network acceleration channel;
    selecting a network transmission path based on network communication quality from the first network transmission path and the second network transmission path; and
    transmitting the data packet to the access node via the selected network transmission path such that the access node transmits the data packet to the application server through the network acceleration channel.

2. The method according to claim 1, wherein
    the access node comprises a first access node and a second access node;
    the first network transmission path is a communication path to the first access node via the wireless LAN communication network;
    the second network transmission path is a communication path to the second access node via the mobile network; and
    the network acceleration channel comprises at least two network acceleration channels respectively accessed by the first access node and the second access node, and the network acceleration channels respectively accessed by the first access node and the second access node all communicate with the application server via a single outbound transit node.

3. The method according to claim 2, wherein
    the first access node satisfies a condition for network communication quality using the wireless LAN communication network, among a plurality of access nodes configured to provide a data transmission rate for the application; and
    the second access node satisfies a condition for network communication quality using the mobile network among the plurality of access nodes.

4. The method according to claim 2, wherein the method further comprises:
    receiving an application selection instruction through an application selection interface, the application selection interface displaying at least one candidate application available for selection, the application selection instruction indicating the application from the at least one candidate application;
    acquiring an access node list available for the mobile terminal to run the application, the access node list comprising a plurality of access nodes configured to provide a data transmission rate for the application;
    for each of the plurality of access nodes, acquiring one or more network communication qualities to the access node via the wireless LAN communication network and via the mobile network, respectively;
    selecting the first access node, which satisfies a condition for network communication quality using the wireless LAN communication network, from among the plurality of access nodes, and configuring the first access node to access a network acceleration channel via the wireless LAN communication network; and
    selecting the second access node, which satisfies a condition for network communication quality using the mobile network, from among the plurality of access nodes, and configuring the second access node to access a network acceleration channel via the mobile network.

5. The method according to claim 4, wherein the acquiring, for each of the plurality of access nodes, the one or more network communication qualities comprises:
    performing a network quality test on each respective access node via the wireless LAN communication network to obtain a first test result;
    performing a network quality test on the respective access node via the mobile network to obtain a second test result;
    determining a first network communication quality to the respective access node via the wireless LAN communication network based on the first test result and first performance data; and
    determining a second network communication quality to the respective access node via the mobile network based on the second test result and second performance data.

6. The method according to claim 5, wherein
    the determining the first network communication quality to the respective access node via the wireless LAN communication network based on the first test result and the first performance data of the access node comprises:
        acquiring the first network communication quality determined according to set weight coefficients applied respectively to the first test result, to the first performance data, and to a combination of the first test result and the first performance data;
    the determining the second network communication quality to the respective access node via the mobile network based on the second test result and the second performance data comprises:
        acquiring the second network communication quality determined according to set weight coefficients applied respectively to the second test result, to the second performance data, and to a combination of the second test result and the second performance data.

7. The method according to claim 1, further comprising:
    acquiring a data matching rule corresponding to the application, the data matching rule comprising: a domain name matching rule and an IP matching rule, wherein the domain name matching rule is based on a regular expression, and the IP matching rule comprises an IP address field including a reference IP and a subnet mask group; and
    the identifying the data packet comprises:
        identifying a data packet matching the data matching rule as the data packet to be accelerated to the application server, the data packet matching the data matching rule being: (i) a data packet containing a domain name matching the regular expression, or (ii) a data packet containing an IP address matching the IP address field.

8. The method according to claim 1, further comprising:
testing the network communication qualities of the first network transmission path and the second network transmission path in response to a determination that a network test condition is satisfied; and
the determining the network communication qualities comprises:
acquiring the network communication qualities of the first network transmission path and the second network transmission path obtained by a latest testing of the network communication qualities.

9. The method according to claim 8, wherein the testing the network communication qualities of the first network transmission path and the second network transmission path comprises:
performing network speed measurement on the access node via the wireless LAN communication network to obtain a first value of at least one network speed evaluation parameter;
acquiring a network communication quality score of the first network transmission path, the network communication quality score of the first network transmission path being calculated according to weights of different network speed evaluation parameters, as applied to the first value of the at least one network speed evaluation parameter;
performing network speed measurement on the access node via the mobile network to obtain a second value of at least one network speed evaluation parameter; and
acquiring a network communication quality score of the second network transmission path, the network communication quality score of the second network transmission path being calculated according to weights of different network speed evaluation parameters, as applied to the second value of the at least one network speed evaluation parameter.

10. An application acceleration apparatus, comprising:
processing circuitry configured to
identify a data packet to be transmitted by an application running on a mobile terminal as a data packet to be accelerated to an application server, wherein the mobile terminal is configured to access a wireless local area network (LAN) communication network and a mobile network;
determine network communication qualities of a first network transmission path and a second network transmission path associated with the application, the first network transmission path being a communication path to an access node via the wireless LAN communication network, the second network transmission path being a communication path to the access node via the mobile network, wherein the access node is configured to access a network acceleration channel;
select a network transmission path based on network communication quality from the first network transmission path and the second network transmission path; and
transmit the data packet to the access node via the selected network transmission path such that the access node transmits the data packet to the application server through the network acceleration channel.

11. The apparatus according to claim 10, wherein
the access node comprises a first access node and a second access node;
the first network transmission path is a communication path to the first access node via the wireless LAN communication network;
the second network transmission path is a communication path to the second access node via the mobile network; and
the network acceleration channel comprises at least two network acceleration channels respectively accessed by the first access node and the second access node, and the network acceleration channels respectively accessed by the first access node and the second access node all communicate with the application server via a single outbound transit node.

12. The apparatus according to claim 11, wherein
the first access node satisfies a condition for network communication quality using the wireless LAN communication network, among a plurality of access nodes configured to provide a data transmission rate for the application; and
the second access node satisfies a condition for network communication quality using the mobile network, among the plurality of access nodes.

13. The apparatus according to claim 11, wherein the processing circuitry is further configured to:
receive an application selection instruction through an application selection interface, the application selection interface displaying at least one candidate application available for selection, the application selection instruction indicating the application from the at least one candidate application;
acquire an access node list available for the mobile terminal to run the application, the access node list comprising a plurality of access nodes configured to provide a data transmission rate for the application;
for each of the plurality of access nodes, acquire one or more network communication qualities to the access node via the wireless LAN communication network and via the mobile network, respectively;
select the first access node, which satisfies a condition for network communication quality using the wireless LAN communication network, from among the plurality of access nodes, and configuring the first access node to access a network acceleration channel via the wireless LAN communication network; and
select the second access node, which satisfies a condition for network communication quality using the mobile network, from among the plurality of access nodes, and configuring the second access node to access a network acceleration channel via the mobile network.

14. The apparatus according to claim 13, wherein the processing circuitry is further configured to:
perform a network quality test on each respective access node via the wireless LAN communication network to obtain a first test result;
perform a network quality test on the respective access node via the mobile network to obtain a second test result;
determine a first network communication quality to the respective access node via the wireless LAN communication network based on the first test result and first performance data; and
determine a second network communication quality to the respective access node via the mobile network based on the second test result and second performance data.

15. The apparatus according to claim 14, wherein the processing circuitry is further configured to:
- acquire the first network communication quality determined according to set weight coefficients applied respectively to the first test result, to the first performance data, and to a combination of the first test result and the first performance data; and
- acquire the second network communication quality according to set weight coefficients applied respectively to the second test result, to the second performance data, and to a combination of the second test result and the second performance data.

16. The apparatus according to claim 10, wherein the processing circuitry is further configured to:
- acquire a data matching rule corresponding to the application, the data matching rule comprising: a domain name matching rule and an IP matching rule, wherein the domain name matching rule is based on a regular expression, and the IP matching rule comprises an IP address field including a reference IP and a subnet mask group; and
- identify a data packet matching the data matching rule as the data packet to be accelerated to the application server, the data packet matching the data matching rule being: (i) a data packet containing a domain name matching the regular expression, or (ii) a data packet containing an IP address matching the IP address field.

17. The apparatus according to claim 10, wherein the processing circuitry is further configured to:
- test network communication qualities of the first network transmission path and the second network transmission path in response to a determination that a network test condition is satisfied; and
- acquire the network communication qualities of the first network transmission path and the second network transmission path obtained by a latest testing of the network communication qualities.

18. The apparatus according to claim 17, wherein the processing circuitry is further configured to:
- perform network speed measurement on the access node via the wireless LAN communication network to obtain a first value of at least one network speed evaluation parameter;
- acquire a network communication quality score of the first network transmission path, the network communication quality score of the first network transmission path being calculated according to weights of different network speed evaluation parameters, as applied to the first value of the at least one network speed evaluation parameter;
- perform network speed measurement on the access node via the mobile network to obtain a second value of at least one network speed evaluation parameter; and
- acquire a network communication quality score of the second network transmission path, the network communication quality score of the second network transmission path being calculated according to weights of different network speed evaluation parameters, as applied to the second value of the at least one network speed evaluation parameter.

19. The apparatus according to claim 10, wherein the apparatus is incorporated in the mobile terminal.

20. A non-transitory computer-readable storage medium storing computer-readable instructions thereon, which, when executing by processing circuitry, cause the processing circuitry to perform an application acceleration method comprising:
- identifying a data packet to be transmitted by an application running on a mobile terminal as a data packet to be accelerated to an application server, wherein the mobile terminal is configured to access a wireless local area network (LAN) communication network and a mobile network;
- determining network communication qualities of a first network transmission path and a second network transmission path associated with the application, the first network transmission path being a communication path to an access node via the wireless LAN communication network, the second network transmission path being a communication path to the access node via the mobile network, wherein the access node is configured to access a network acceleration channel;
- selecting a network transmission path based on network communication quality from the first network transmission path and the second network transmission path; and
- transmitting the data packet to the access node via the selected network transmission path such that the access node transmits the data packet to the application server through the network acceleration channel.

* * * * *